(12) United States Patent
Hiroshige

(10) Patent No.: US 7,554,561 B2
(45) Date of Patent: Jun. 30, 2009

(54) APPARATUS FOR DISPLAYING AN IMAGE

(75) Inventor: Akira Hiroshige, Tokyo-to (JP)

(73) Assignee: Seiko Epson Corporation, Tokyo (JP)

( * ) Notice: Subject to any disclaimer, the term of this patent is extended or adjusted under 35 U.S.C. 154(b) by 97 days.

(21) Appl. No.: 11/373,689

(22) Filed: Mar. 10, 2006

(65) Prior Publication Data

US 2006/0203008 A1 Sep. 14, 2006

(30) Foreign Application Priority Data

Mar. 10, 2005 (JP) ............................. 2005-066703

(51) Int. Cl.
G09G 5/36 (2006.01)
(52) U.S. Cl. ...................................... 345/619
(58) Field of Classification Search ................. 345/619
See application file for complete search history.

(56) References Cited

U.S. PATENT DOCUMENTS

| | | | |
|---|---|---|---|
| 6,738,075 B1 * | 5/2004 | Torres et al. ................. 715/723 |
| 7,098,943 B2 * | 8/2006 | Shibutani ................. 348/211.1 |
| 2002/0126208 A1 * | 9/2002 | Misue et al. ................. 348/211 |
| 2003/0011699 A1 * | 1/2003 | Tanizoe et al. ......... 348/333.07 |
| 2003/0184647 A1 * | 10/2003 | Yonezawa et al. ........... 348/143 |
| 2004/0247174 A1 * | 12/2004 | Lyons et al. ................. 382/154 |
| 2005/0146616 A1 * | 7/2005 | Parulski et al. ........... 348/207.2 |
| 2007/0019096 A1 * | 1/2007 | Yoneda ................. 348/333.01 |
| 2007/0097442 A1 * | 5/2007 | Shiohara ..................... 358/3.21 |
| 2007/0132860 A1 * | 6/2007 | Prabhu et al. ............ 348/231.3 |

FOREIGN PATENT DOCUMENTS

| | | |
|---|---|---|
| JP | 06-236592 | 8/1994 |
| JP | 11-085445 | 3/1999 |
| JP | 11-231989 | 8/1999 |
| JP | 2000-187554 | 7/2000 |

* cited by examiner

*Primary Examiner*—Javid A Amini
(74) *Attorney, Agent, or Firm*—John J. Penny, Jr.; Catherine J. Toppin; Edwards Angell Palmer & Dodge LLP

(57) ABSTRACT

An apparatus for displaying an image comprises, an access unit that accesses images stored in a recording medium; an image order management unit that orders a plurality of the images cyclically in such a manner that an end one of the images may be followed by a top one of the images; a first input unit that inputs a first command; a second input unit that inputs a second command; and a display unit that displays on one screen a display-subject area that corresponds to one portion of such a limitless two-dimensional array of the images that the images adjacent to each other in an x-direction may have consecutive order numbers and a difference in order number between the images adjacent to each other in a y-direction may be a first value of not less than two, and moves the display-subject area in the x-direction in accordance with the first command and in the y-direction in accordance with the second command.

5 Claims, 17 Drawing Sheets

| File name | Identifier |
|---|---|
| SEA. jpg | 1 |
| SMILE. jpg | 2 |
| ⋮ | ⋮ |
| FLOWER. jpg | 10 |
| AUTUMN LEAVES. jpg | 11 |
| MOUNTAIN. jpg | 12 |
| ⋮ | ⋮ |
| MY HOME. jpg | 90 |
| TREE. jpg | 91 |
| DRIVING. jpg | 92 |
| ⋮ | ⋮ |
| SUN RISE. jpg | 100 |

| Folder name | Identifier |
|---|---|
| MOUNTAIN CLIMBING | 1 |
| SUMMER VACATION | 2 |
| FAMILY | 3 |

FIG. 15

APPARATUS FOR DISPLAYING AN IMAGE

The entire disclosure of Japanese Patent Application No. 2005-66703, filed Mar. 10, 2005, is expressly incorporated by reference herein.

BACKGROUND OF THE INVENTION

1. Technical Field

The present invention relates to an apparatus for displaying an image.

2. Related Art

Conventionally, known apparatus are a digital still camera (DSC) equipped with a display device to display a picked up image and an image reproducer equipped with a display device to display an image read from an external storage such as a removable memory. Such an apparatus can display on its display device a picked up image or an image read from the external storage device. However, such an apparatus displays the immediately following or immediately preceding image consecutively on its display device through a predetermined operation, so that such a problem occurs that as the number of images that can be displayed increases, operations to select any of these images to be displayed become complicated. For example, in this type of apparatus, to select the following tenth image to be displayed, a user needs to press a button ten times or continue to hold it down until that image is displayed.

SUMMARY

An advantage of some aspects of the invention is to provide an apparatus for displaying an image that can quickly select a desired image easily.

(1) An apparatus for displaying an image that achieves this advantage comprises, an access unit that accesses images stored in a recording medium; an image order management unit that orders a plurality of the images cyclically in such a manner that an end one of the images may be followed by a top one of the images; a first input unit that inputs a first command; a second input unit that inputs a second command; and a display unit that displays on one screen a display-subject area that corresponds to one portion of such a limitless two-dimensional array of the images that the images adjacent to each other in an x-direction may have consecutive order numbers and a difference in order number between the images adjacent to each other in a y-direction may be a first value of not less than two, and moves the display-subject area in the x-direction in accordance with the first command and in the y-direction in accordance with the second command.

According to this apparatus, a user can select any of the images to be displayed on the screen by using the first and second commands with imaging such a limitless two-dimensional array of the plurality of images that the images adjacent to each other in an x-direction may have consecutive order numbers and a difference in order number between the images adjacent to each other in a y-direction may be a first value of not less than two. Therefore, according to the apparatus, the user can easily select a desired one of a plurality of images. Further, according to the apparatus, the user can select, by using the second command, another one of the images that has a difference in order number of not less than two with respect to the image currently displayed on the screen, thereby selecting any desired one of a plurality of images quickly.

(2) Wherein the apparatus to achieve the above-described advantage, the display unit may move the display-subject area to a position that includes an entirety of one of the images, each time the first or second command is input.

According to this apparatus, an entire image can be easily manipulated so that it may be contained in the screen.

(3) wherein the apparatus to achieve the above-described advantage, the display unit may continuously move the display-subject area from one to the other of two of the images adjacent to each other in the x-direction or y-direction.

According to this apparatus, the user readily images such a limitless two-dimensional array that the images adjacent to each other in the x-direction may have consecutive order numbers and the images adjacent to each other in the y-direction may have the first value of not less than two as a difference in order number between themselves and, therefore, can further easily select a desired one of the plurality of images.

(4) The apparatus to achieve the above-described advantage comprises a folder order management unit that cyclically orders a plurality of folders each of which stores the images in such a manner that the end folder of the folders may be followed by the top folder of the folders; a fourth input unit that inputs a folder select command; and a folder selection unit that sequentially selects the folders in accordance with the folder select command, wherein the display-subject area corresponds to one portion of the two-dimensional array of the images stored in the selected folder.

According to this apparatus, a plurality of folders is ordered cyclically and an image stored in a selected one of the folders is displayed, so that even if a plurality of images is stored over two or more of the plurality of folders, the user can easily select a desired one of the images.

(5) An apparatus for displaying an image that achieves the above-described advantage comprises an access unit that accesses images stored in a recording medium; an image order management unit that orders a plurality of the images; a first input unit that inputs a first command; a second input unit that inputs a second command; a third input unit that inputs a third command; and a display unit that displays on one screen a display-subject area that corresponds to one portion of such a three-dimensional array of the images that the images adjacent to each other in an x-direction may have consecutive order numbers, a difference in order number between the images adjacent to each other in a y-direction may be a first value of not less than two, and a difference in order number between the images adjacent to each other in a z-direction may be a second value of not less than two different from the first value, and moves the display-subject area in the x-direction in accordance with the first command, in the y-direction in accordance with the second command, and in the z-direction in accordance with the third command.

According to this apparatus, a user can select any of the images to be displayed on the screen by using the first, second, and third commands by imaging such a three-dimensional array of the plurality of images that the images adjacent to each other in an x-direction may have consecutive order numbers, a difference in order number between the images adjacent to each other in a y-direction may be a first value of not less than two, and a difference in order number between the images adjacent to each other in a z-direction may be a second value of not less than two different from the first value. Therefore, according to the apparatus of the present invention, the user can easily select a desired one of a plurality of images. Further, according to the apparatus of the present invention, the user can select, by using the second or third command, another one of the images that has a difference in order number of not less than two with respect to the image currently displayed on the screen, thereby selecting any desired one of a plurality of images quickly.

(6) Wherein the apparatus to achieve the above-described advantage, the image order management unit may order a plurality of the images cyclically in such a manner that an end one of the images may be followed by a top one of the images.

According to this apparatus, the image order management means orders a plurality of images cyclically. That is, by this apparatus, a display-subject area that corresponds to one portion of such a three-dimensional array that images are limitlessly arranged in all of x-, y-, and z-directions or such a three-dimensional array that the images are limitlessly arranged in either one of the x-, y-, and z-directions moves over the limitless three-dimensional array in accordance with the first, second, or third command.

(7) Wherein the apparatus to achieve the above-described advantage, the display unit may move the display-subject area to a position that includes an entirety of one of the images, each time the first, second, or third command is input.

According to this apparatus, an entire image can be easily manipulated so that it may be contained in the screen.

(8) Wherein the apparatus to achieve the above-described advantage, the display unit may continuously move the display-subject area from one to the other of two of the images adjacent to each other in the x-direction or y-direction.

According to this apparatus, the user readily images such a two-dimensional array of the plurality of images that the images adjacent to each other in the x-direction may have consecutive orders and the images adjacent to each other in the y-direction may have the first value of not less than two as a difference in order number between themselves and, therefore, can further easily select a desired one of the plurality of images.

It is to be noted that respective functions of the plurality of units equipped to the present invention are realized by hardware resources whose functions are each specified by a configuration itself, hardware resources whose functions are each specified by a program, or combinations thereof. Further, the functions of this plurality of units are not limited to those realized by hardware resources that are independent of each other physically.

Further, the present invention can be specified not only as an invention of an apparatus but also as an invention of a program, an invention of a recording medium in which this program is stored, and an invention of a method.

BRIEF DESCRIPTION OF THE DRAWINGS

FIG. 7 is a schematic diagram showing a table for ordering images;

FIG. 15 is a schematic diagram showing a table for ordering folders;

DESCRIPTION OF EXEMPLARY EMBODIMENTS

The following will describe modes of the present invention with reference to a plurality of embodiments. Components indicated by the same reference symbols in any of these embodiments correspond to those of the other embodiments.

First Embodiment

Figure 2:
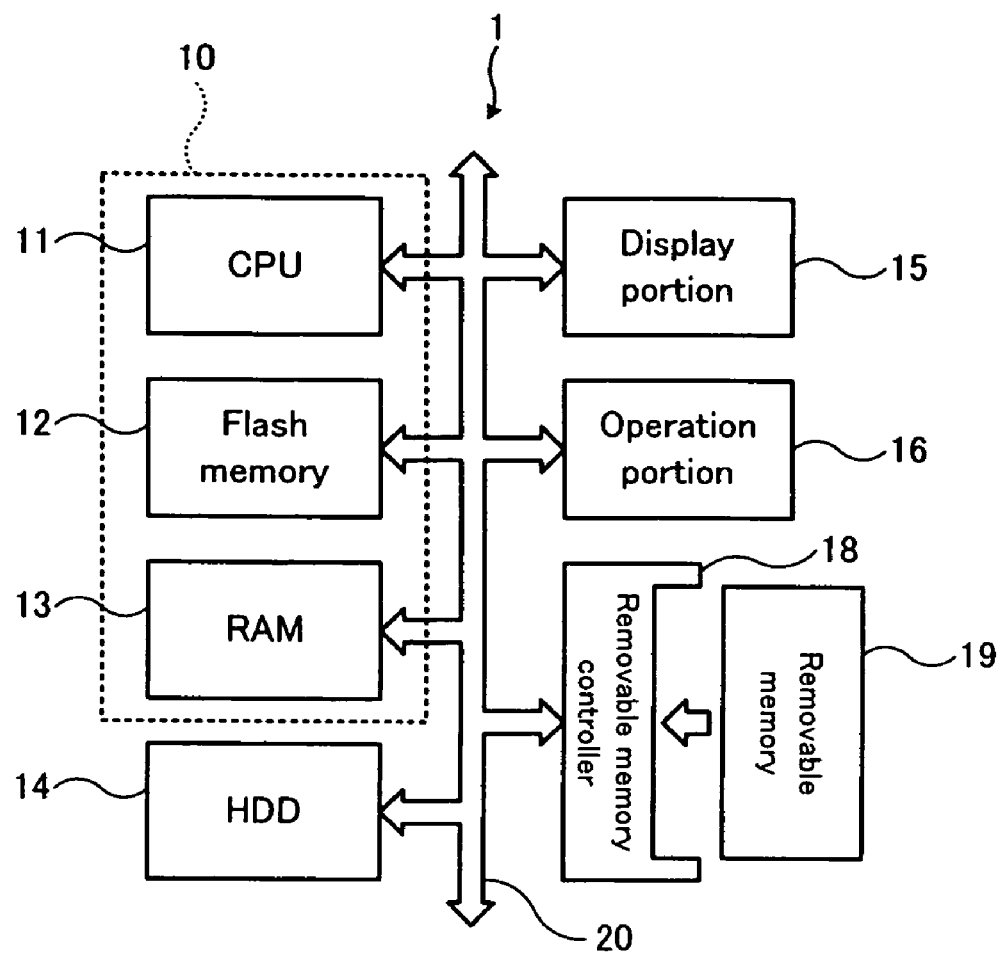
FIG. 2 is a block diagram of the image reproducer of the present invention.

FIG. 2 is a block diagram showing a hardware configuration of an image reproducer 1 related to the first embodiment of the present invention. The image reproducer 1 comprises a CPU11, a flash memory 12, an RAM13, a Hard Disk Drive (HDD) 14, a display portion 15., an operation portion 16, and a removable memory controller 18, wherein they are mutually connected through a bus 20. The image reproducer 1 as an apparatus for displaying an image is an electronic apparatus for reading images photographed by a DSC, etc. and stored in a removable memory 19, accumulating them in the HDD14, and displaying them at the display portion 15. It is to be noted that the apparatus for displaying an image may be a DSC, a communication apparatus equipped with an display device such as a cell phone, a Personal Digital Assistance (PDA), or a portable terminal unit such as an electronic book terminal.

A control portion 10 includes the CPU11, the flash memory 12, the RAM13 and the like. The CPU11 loads a program stored in the flash memory 12 into the RAM13 and executes the program, thereby controlling an entirety of the image reproducer 1. The flash memory 12 is a nonvolatile memory for storing programs and data. In the flash memory 12, an image reproduction program is stored which is executed by the CPU11 in a reproduction mode. In the reproduction mode of the image reproducer 1, a user can select a display-subject image from among images stored in the HDD14 and display it at a Liquid Crystal Display (LCD) 21. The RAM13 is a volatile memory for storing a variety of programs, data, etc. temporarily. The RAM13 functions also as a video memory to store screen display data in its predetermined area.

The HDD14 is provided with a hard disk, a hard disk controller, etc., and stores an Operating System (OS), a variety of programs, an image file to store images, various data, etc.

The display portion 15 as display means is provided with the LCD21 (see FIG. 3), a display controller for controlling the LCD21, etc. The display portion 15 is controlled by the CPU11, to display a menu, images stored in the HDD14 and the removable memory 19, etc.

The operation portion 16 is equipped with a variety of buttons for selecting a variety of menus and images to be displayed at the display portion 15.

The removable memory controller 18 is controlled by the CPU11, to read an image stored in the removable memory 19 to be mounted into a card slot and write various data into the removable memory 19. The removable memory 19 is an external storage medium that can be attached to and detached from a card slot, not shown, specifically coming in a card type flash memory.

Figure 3:
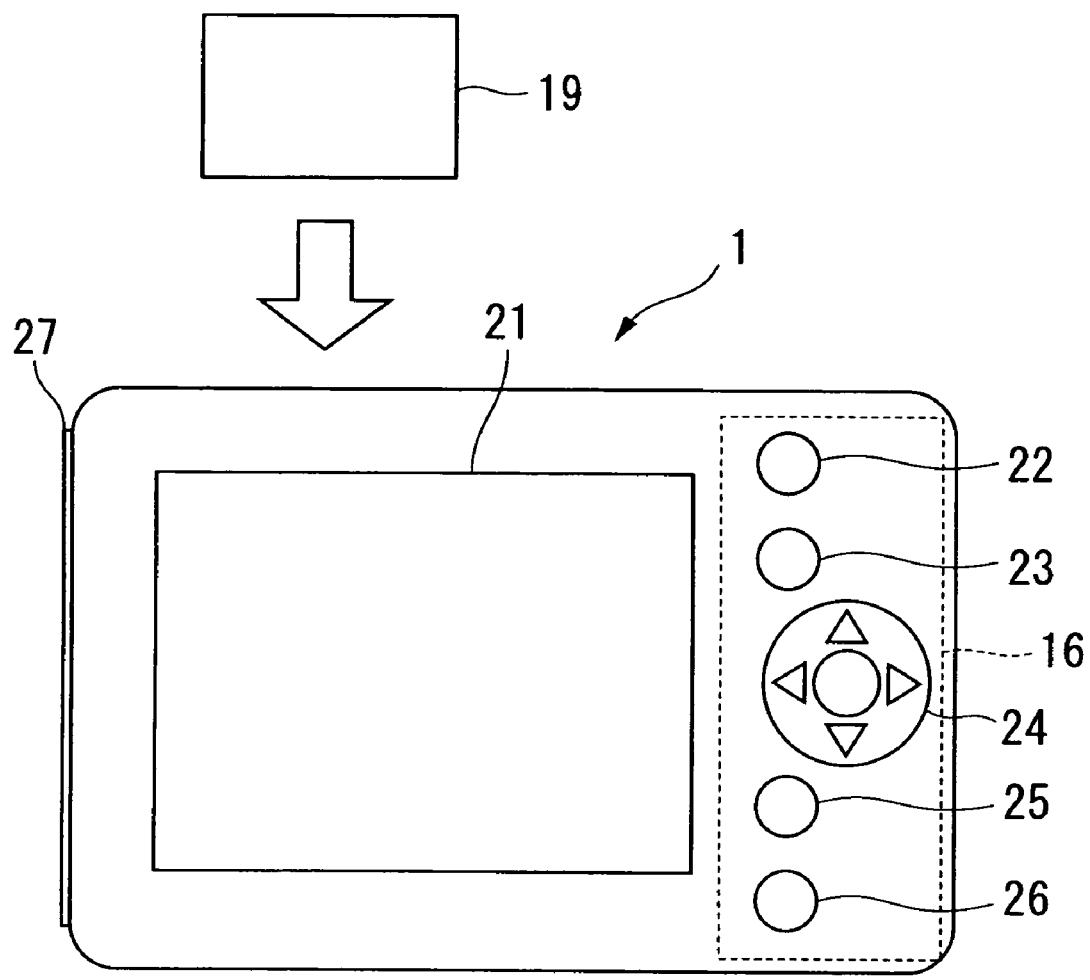
FIG. 3 is a schematic diagram showing an external view of the image reproducer of the present invention.
Figure 4:
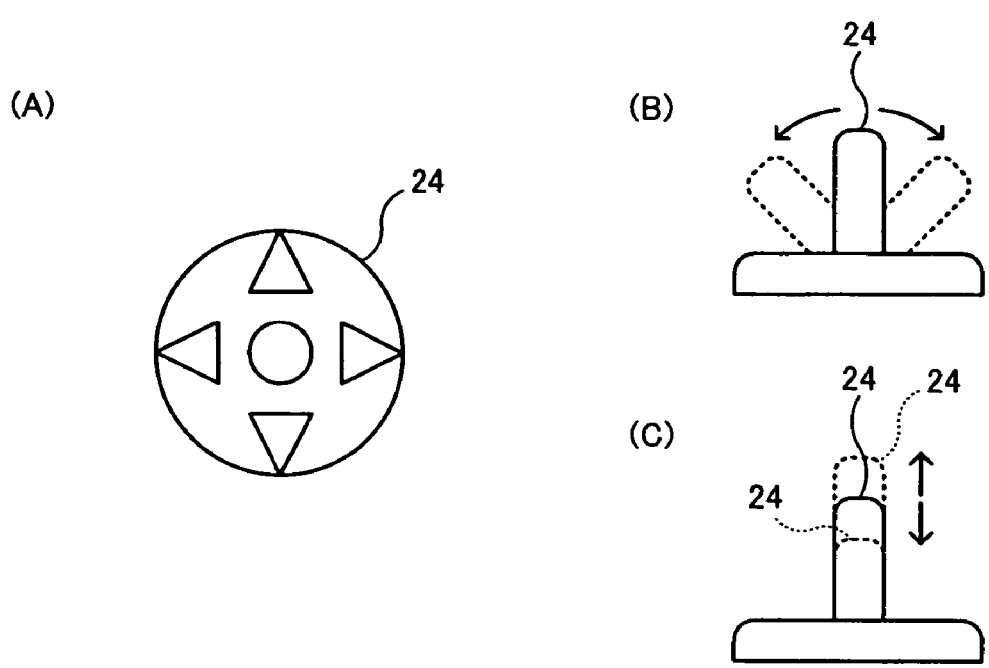
FIG. 4 is an explanatory schematic diagram of lever manipulations related to the present invention.

FIG. 3 is a schematic diagram showing an external view of the image reproducer 1. The image reproducer 1 comprises the LCD21, the operation portion 16, an interface connector 27 such as a USB, and a card slot not shown. To the interface connector 27, a cable is connected to communicate with a PC, a CD drive, a printer, etc. The operation portion 16 comprises a print button 22, a menu button 23, a lever 24, an OK button 25, a CANCEL button 26, etc. The lever 24 as first input means and second input means can be manipulated rightward or leftward, upward or downward, upper-rightward, lower-rightward, lower-leftward, and upper-leftward as shown in FIG. 4B, and can be pressed in and pulled up as shown in FIG. 4C. It is to be noted that the first and second input means may each be a cross key or a pointing device such as a trackball.

Figure 5:
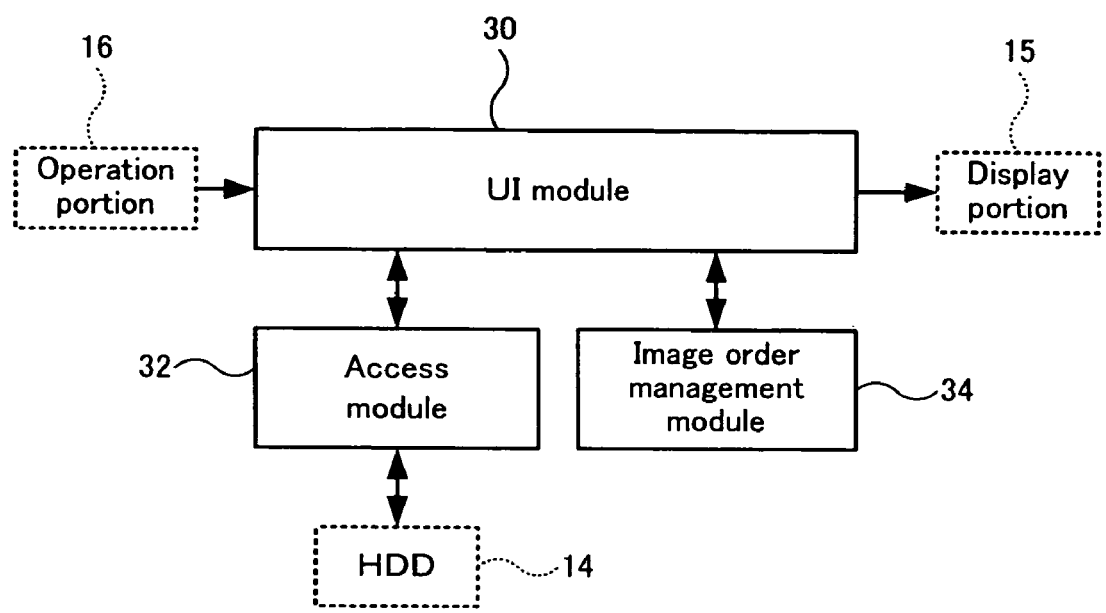
FIG. 5 is a block diagram showing a logical configuration of an image reproduction program.

FIG. 5 is a block diagram showing a logical configuration of the above-described image reproduction program.

Figure 6:
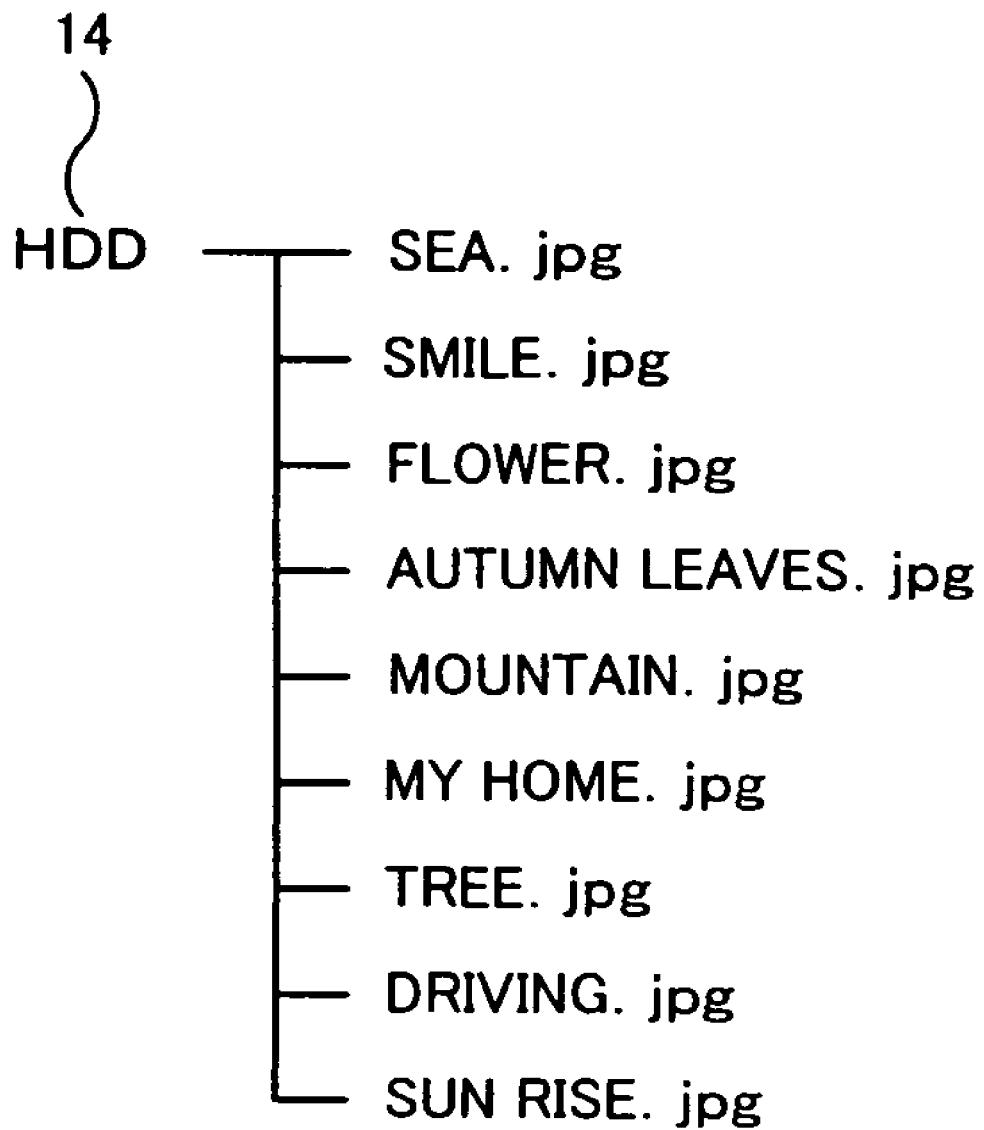
FIG. 6 is a schematic diagram showing a file configuration of an HDD related to the first embodiment.

An image order management module 34 is a program component that causes the control portion 10 to function as image order management means. In response to a request from a user interface module (UI module) 30, the image order management module 34 orders a plurality of images (see FIG. 6) stored in the HDD14 cyclically in such a manner that the end one of the images may be followed by the top one of the images, to specify which one of the images to be displayed next. Specifically, the image order management module 34 creates or updates at a predetermined timing a table 70 (see FIG. 7) that prescribes order numbers of image files, based on a file name of the image files or a date when the image files were created. The image order management module 34 specifies an image to be displayed next, by ordering the image files cyclically as described above based on this table 70. It is to be noted that the predetermined timing refers to a timing, for example, after an image is read into the HDD14 from the removable memory 19, etc., after an image is deleted from the HDD14, after the image reproducer 1 is actuated, etc.

An access module 32 is a program component that causes the control portion 10 to function as access means. The access module 32 accesses an image stored in the HDD14 in response to a request from the UI module 30.

Figure 8:
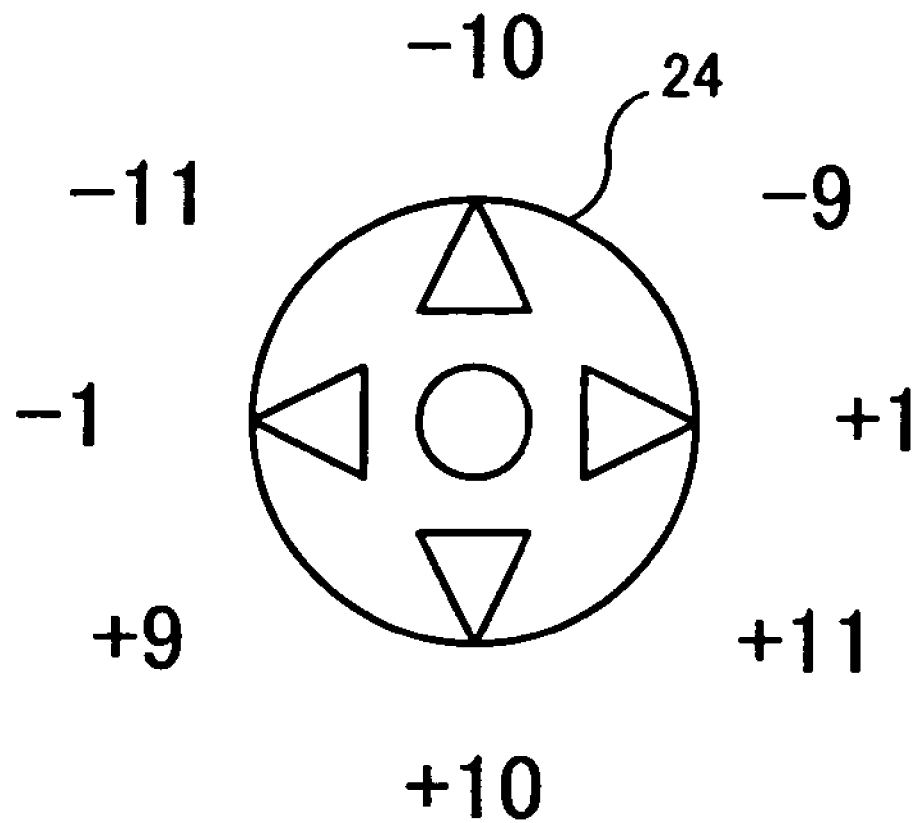
FIG. 8 is an explanatory schematic diagram of a command received by lever manipulations.

The UI module 30 is a program component that causes the control portion 10 to function as the first and second input means and the display means. The UI module 30 receives a command to select a desired image. Specifically, the UI module 30 receives commands to select images one order number behind or ahead, 10 order numbers behind or ahead, nine order numbers behind, 11 order numbers ahead, nine order numbers ahead, and 11 order numbers behind the currently displayed image in accordance with the rightward or leftward manipulation, upward or downward manipulation, upper-rightward manipulation, lower-rightward manipulation, lower-leftward manipulation, and upper-leftward manipulation of the lever 24 respectively (see FIG. 8). Then, the UI module 30 inquires the image order management module 34 about an image that corresponds to a received command and causes the image order management module 34 to read a specified image into the access module 32, thereby displaying that image at the LCD21. A command to select an image one order number behind or ahead the currently displayed image corresponds to "first command" described in the claim. A command to select an image 10 order numbers behind or ahead the currently displayed image corresponds to "second command" in the claim, and a difference in order number between the image ten order numbers behind or ahead the currently displayed image that is selected by this command and this currently displayed image corresponds to "first value" described in the claim.

Figure 1:
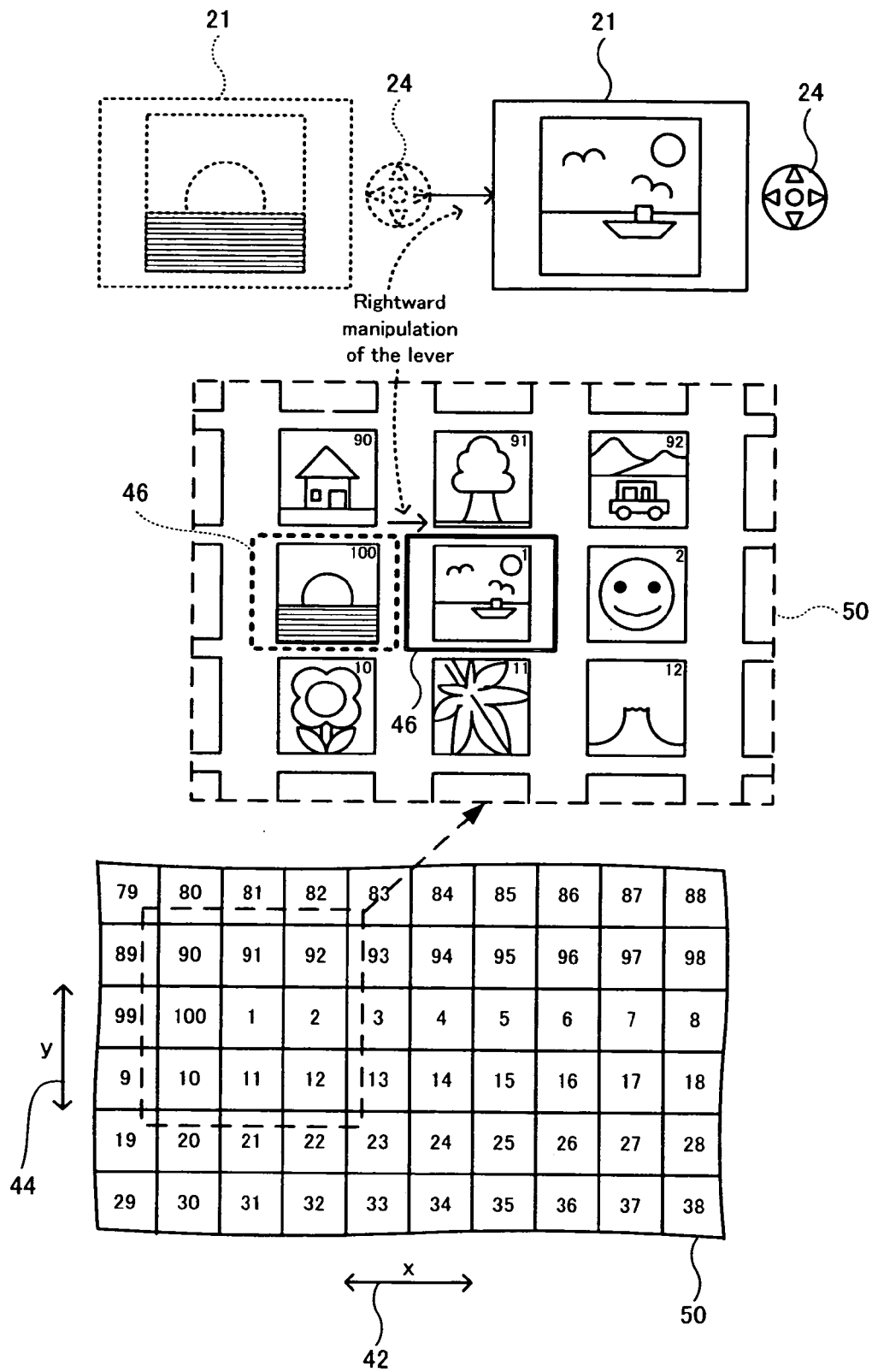
FIG. 1 is an explanatory schematic diagram of an image reproducer according to a first embodiment.

By thus causing the UI module 30 to display a next image by relating the images to each other cyclically, it is possible to realize such a user interface that a display-subject area (see an area 46) at the LCD21 may apparently move, in a direction in which the lever 24 is manipulated, over a limitless two-dimensional array 50 in which the images are arranged cyclically in an x-direction (see an arrow 42) in such a manner that the images whose order numbers are consecutive may be adjacent to each other and also cyclically in a y-direction (see an arrow 44) in such a manner that the images that have a difference in order number of 10 may be adjacent to each other as shown in FIG. 1. This user interface permits a user to select and display an image by manipulating the lever 24 while envisioning the images arranged in the limitless two-dimensional array 50.

Although the x-direction and the y-direction orthogonal to each other have been shown, they may not be orthogonal to each other.

Further, a command to be received by the UI module 30 is not limited to that of the above-described specific example as far as it is possible to realize such a user interface that a display-subject area may move over the limitless two-dimensional array 50 as described above. Specifically, supposing that rightward or leftward manipulation and upward or downward manipulation of the lever 24 correspond to commands to display images that are "−L" order numbers ahead, "R" order numbers ahead, "−U" order numbers ajead, and "D" order numbers ahead the currently displayed image, the UI module 30 may receive rightward or leftward manipulation and upward or downward manipulation of the lever 24 as such commands that relationships of "L=R" and "U=D" may be established respectively and receive upper-rightward manipulation, lower rightward manipulation, lower leftward manipulation, and upper leftward manipulation of the lever 24 as commands to display images that are "R−U" order numbers ahead, "R+D" order numbers ahead, "−L+D" order numbers ahead, and "−L−U" order numbers ahead the currently displayed image respectively. It is to be noted that to be a "−L" order numbers ahead may mean to be an "L" order numbers behind. However, from a viewpoint of operability, preferably either "L" or "U" may be "1".

Figure 9:
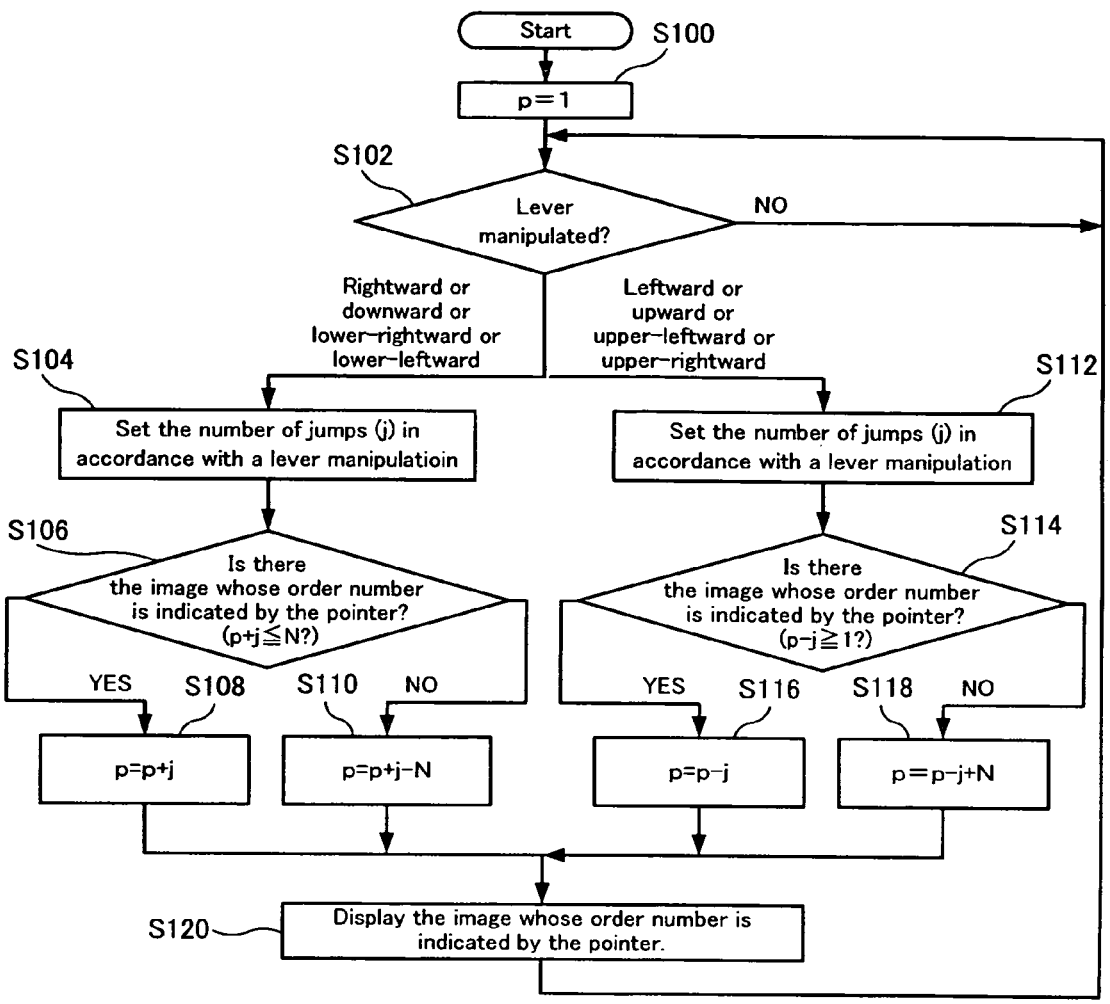
FIG. 9 is a flowchart of an image display method in a reproduction mode.

FIG. 9 is a flowchart of an image display method in the reproduction mode. In the following description, it is supposed that N number of images are stored in the HDD14 and these images are assigned order numbers of 1 through N.

First the control portion 10 sets to 1 a pointer (p) that indicates an order number of an image to be displayed at the LCD21 (see step S100).

Next, the control portion 10 receives a manipulation of the lever 24 (see step S102). If it has specifically received a rightward manipulation, a downward manipulation, a lower-rightward manipulation, or a lower-leftward manipulation the control portion 10 performs processing of steps S104 through S110, and if it has specifically received a leftward manipulation, an upward manipulation, an upper-rightward manipulation, or an upper-leftward manipulation, the control portion 10 performs processing of steps S112 through S118.

In the processing of steps S104 through S110, the control portion 10 specifies an image a predetermined order number ahead the currently displayed one as an image to be displayed next, by ordering the images cyclically in such a manner that the end one of the images may be followed by the top one of them in response to a manipulation of the lever 24. Specifically, first the control portion 10 sets the number of jumps (j) in accordance with the received manipulation of the lever 24 (see step S104). More specifically, for example, the control portion 10 sets "j=1", "j=10", "j=11", and "j=9" as the number of jumps in accordance with a rightward manipulation, a downward manipulation, a lower-rightward manipulation, and a lower-leftward manipulation respectively (see FIG. 8). Next, the control portion 10 decides whether there is an image whose order number is indicated by the pointer (see step S106). If such is the case, the control portion 10 sets "p=p+j" and, otherwise, sets "p=p+j−N".

In the processing of steps S112 through S118, the control portion 10 specifies an image that is a predetermined order number behind the currently displayed one as an image to be displayed next, by ordering the images cyclically in such a manner that the end one of the images may be followed by the top one of the images in response to a manipulation of the lever 24. Specifically, first the control portion 10 sets the number of jumps (j) in accordance with the received manipulation of the lever 24 (see step S112). For example, the control portion 10 sets "j=1", "j=10", "j=11", and "j=9" as the number of jumps in accordance with a leftward manipulation, an upward manipulation, a upper-leftward manipulation, and a upper-rightward manipulation respectively (see FIG. 8). Next, the control portion 10 decides whether there is an image whose order number is indicated by the pointer (see step S114). If such is the case, the control portion 10 sets "p=p−j" and, otherwise, sets "p=p−j+N".

At step S120, the control portion 10 displays at the LCD 21 the image whose order number is indicated by the pointer and returns to the processing of step S102.

Figure 10:
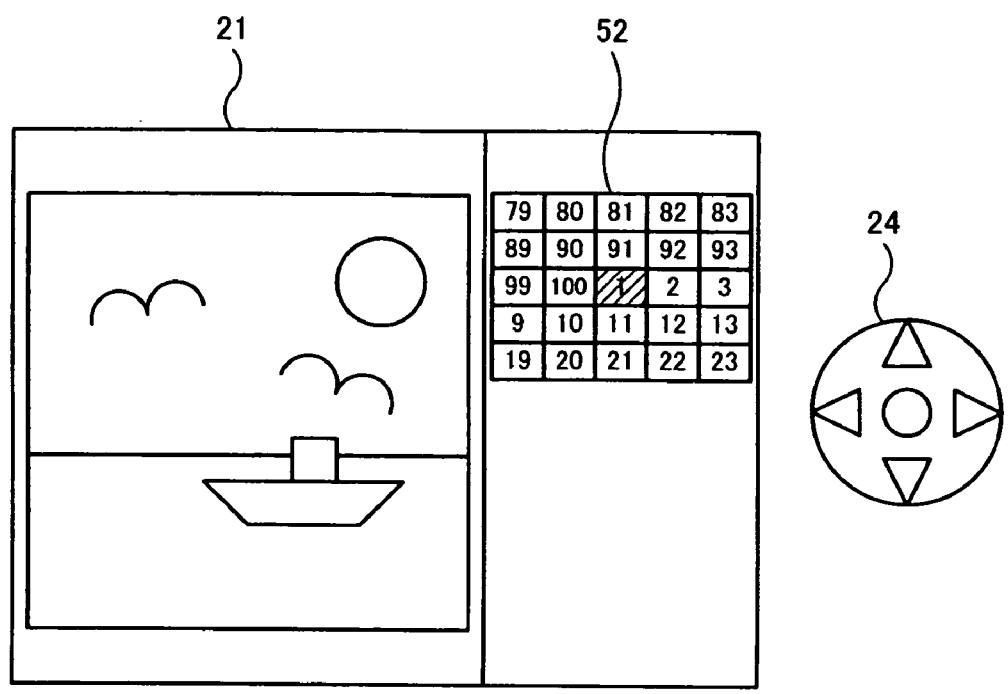
FIG. 10 is an explanatory schematic diagram of a variant of the image reproducer according to the first embodiment.

It is to be noted that the UI module 30 may display at the LCD21 an image 52 that shows a partial area of the limitless two-dimensional array 50 that includes at least an image that can be displayed after being selected by a manipulation of the lever 24 as shown in FIG. 10. In such a manner, the user can recognize a position of a display-subject area on the LCD21 in the limitless two-dimensional array 50, to easily select an image to be displayed at the LCD21 next.

Although the UI module 30 has been described to receive, for example, an upward or downward manipulation of the lever 24 as a command to display an image a plurality of steps behind or ahead the currently displayed image, it may receive a manipulation of inclining the lever 24 in a predetermined direction for a predetermined lapse of time (shorter or longer period than that by ordinary manipulation) as a command to display an image a plurality of steps behind or ahead the currently displayed image.

Further, the UI module 30 may receive a manipulation of inclining the lever 24 in a predetermined direction for a predetermined lapse of time (shorter or longer period than that by an ordinary manipulation) as a command to display an image to which a top image or an end image is attached.

Second Embodiment

In an image reproducer 2 according to a second embodiment, a UI module 30 receives an manipulation of pressing in the lever 24 and that of pulling it up as commands to select images whose order numbers are 100 behind and 100 ahead the currently displayed image respectively, in addition to the commands related to the first embodiment. These commands correspond to "third command" described in the claim, a numeral of 100 as a difference in order number between the thus selected image whose order number is 100 behind or ahead and the currently displayed image corresponds to "second value". Further, the lever 24 related to the second embodiment functions also as third input means.

Figure 11:
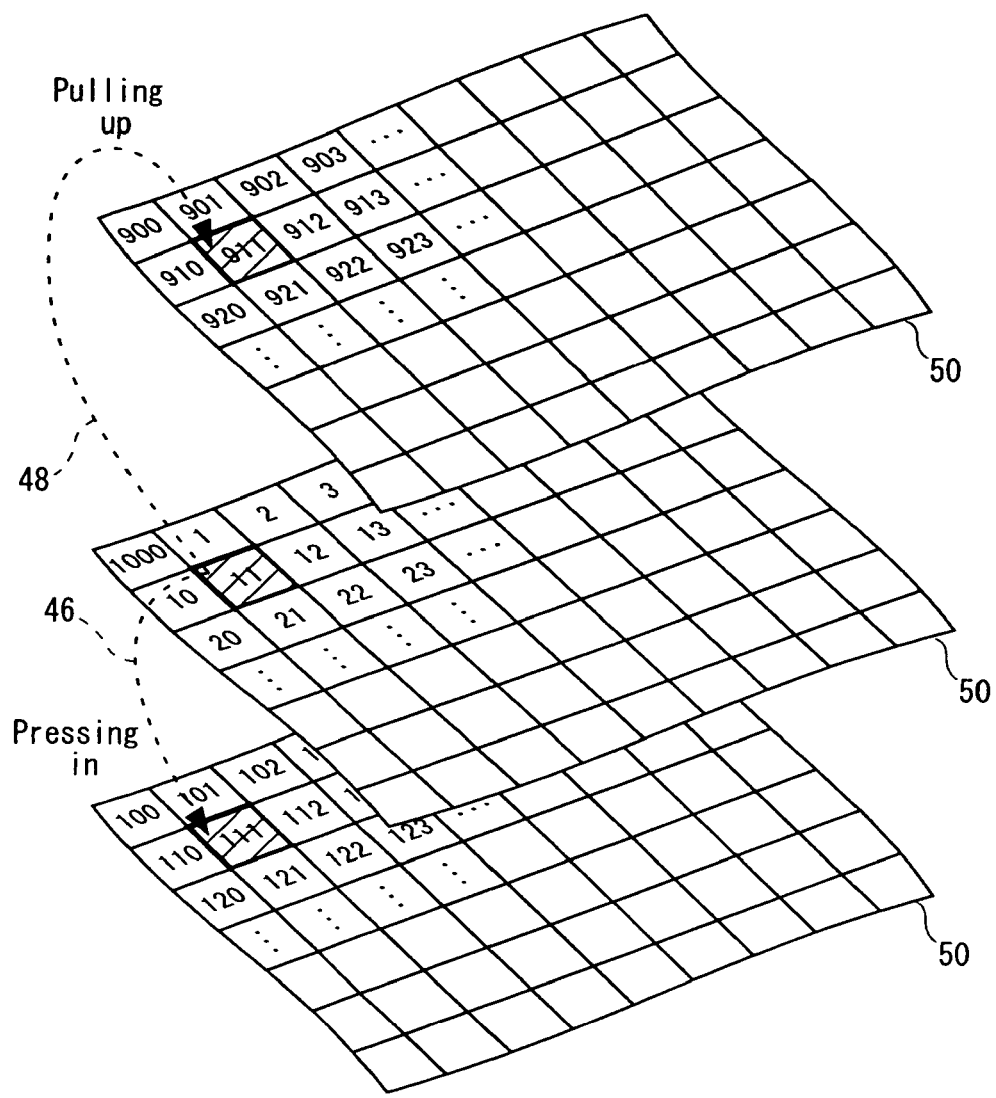
FIG. 11 is an explanatory schematic diagram of an image reproducer according to a second embodiment.

Thus, in the image reproducer 2, it is possible to realize such a user interface that in response to a manipulation of pressing the lever 24 in and a manipulation of pulling it up, a display-subject area may apparently move between a limitless two-dimensional array 50 and another limitless two-dimensional array 50 that is perpendicular to it and vertically adjacent to it in a three-dimensional array in which images are limitlessly arranged in such a manner that a difference in order number between the image arranged in one of these two limitless arrays 50 and the image arranged directly above or below it in the other limitless array 50 may be 100 as shown in FIG. 11 (see arrows 46 and 48 shown in FIG. 11). Therefore, by the image reproducer 2, a user can select and display a desired image even if the number of images stored in an HDD14 increases.

It is to be noted that the UI module 30 may display on a screen an image which is ahead as many as the number of steps that is indicated by a pressing in or pulling up manipulation of the lever 24 without relating the images to each other in order cyclically. In this case, it is possible to realize such a user interface that a display-subject area may apparently move over a three-dimensional array in which a plurality of limitless two-dimensional arrays 50 is arranged limitedly.

Further, the UI module 30, without relating images to each other in order cyclically, may display on the screen an image which is ahead as many as the number of steps that is commanded by any one or all of a rightward or leftward manipulation, an upward or downward manipulation, a upper-rightward manipulation, a lower-rightward manipulation, a lower-leftward manipulation, and an upper-leftward manipulation of the lever 24. In this case, it is possible to realize such a user interface that a display-subject area may move over a three-dimensional array in which limited two-dimensional arrays or limitless two-dimensional arrays which are limited in a predetermined direction are arranged limitlessly.

Further, the UI module 30 may display on the screen an image which is ahead by as many as the number of steps that is commanded by all the manipulations of the lever 24, without relating the images to each other in order cyclically. In this case, it is possible to realize such a user interface that a display-subject area may move over a three-dimensional array in which a plurality of two-dimensional limited areas is arranged limitedly.

Further, the commands to be received by the UI module 30 through manipulations of pressing in and pulling up the lever 24 are not limited to those to display images whose order numbers are 100 behind or ahead but may include a command to display images which have several steps as a difference in order. Further, the manipulations to be received as commands to display at an LCD21 images whose order numbers are behind or ahead by 100 are not limited to those of pressing in and pulling up the lever 24 but may include those of pressing the respective buttons.

Third Embodiment

Figure 12:
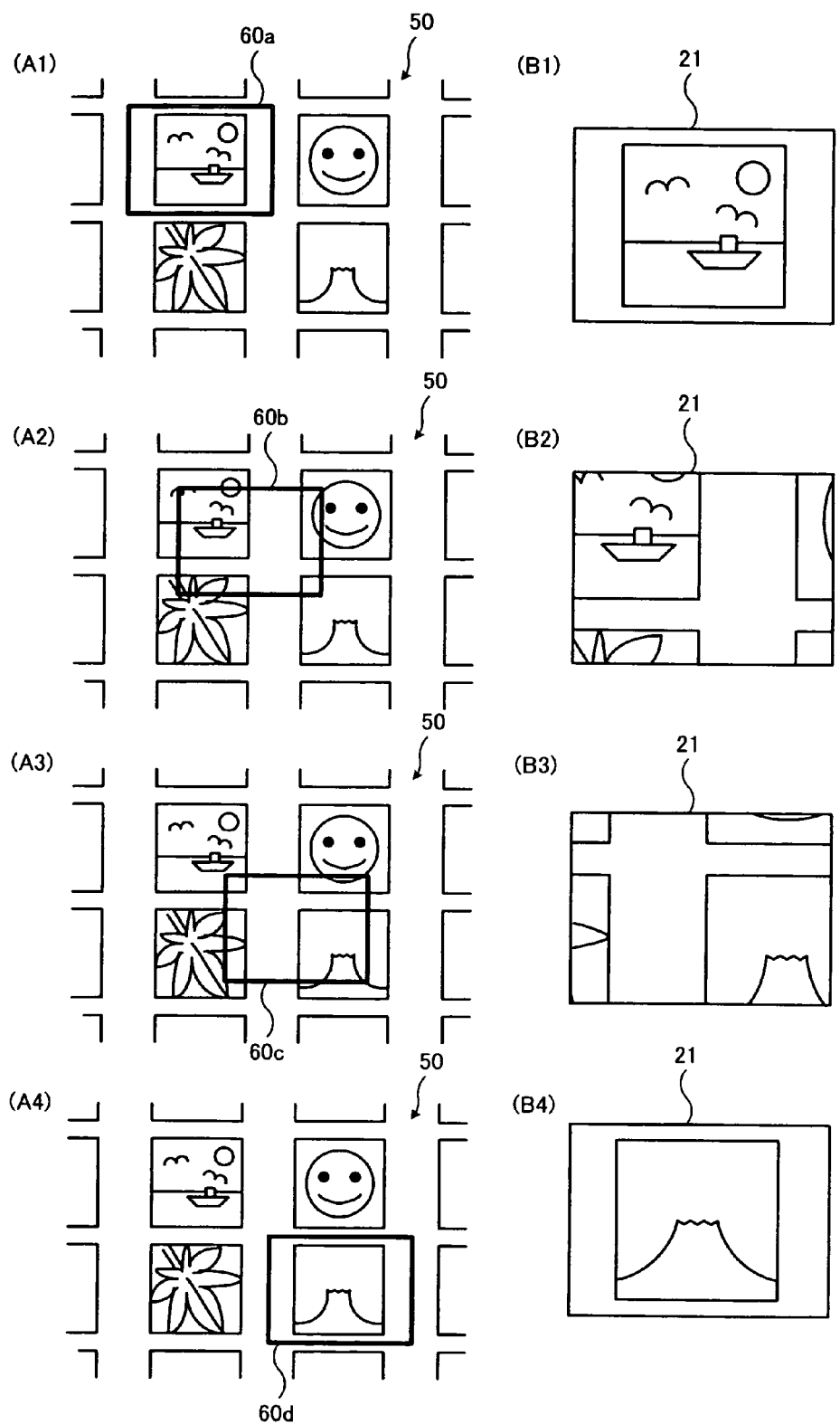
FIG. 12 is an explanatory schematic diagram of an image reproducer according to a third embodiment.

FIG. 12 is an explanatory schematic diagram of a reproduction mode of an image reproducer 3 according to a third embodiment.

As shown in (A1), screen display data of an image of a partial area of a limitless two-dimensional array 50 related to the above-described plurality of embodiments is stored in a predetermined area of an RAM13 of the image reproducer 3. The partial area as used herein refers to an area that includes at least an image currently displayed at an LCD 21 and an image that can be selected and displayed by manipulating a lever 24 in this condition. A UI module 30 related to the third embodiment specifies a desired display-subject area (see a display-subject area 60a shown in (A1)) for this screen display data, to display a screen for that display-subject area at the LCD 21 (see (B1)).

The UI module 30 continuously moves a display-subject area from a display-subject area (see the display-subject area 60a shown in (A1)) of an image currently displayed at the LCD 21 to a display-subject area (see a display-subject area 60d shown in (A4)) of the next image in a period from a moment of displaying the image (e.g., image of SEA.jpg shown in (B1)) at the LCD 21 to a moment of displaying the next image (e.g., image of MOUNTAIN.jpg shown in (B4)) (see display-subject areas 60b and 60c shown in (A2) and (A3) respectively). It is thus possible to display a screen that shows a process of such a movement that the display-subject area may apparently move over a limitless two-dimensional array 50 in a direction in which the lever 24 is manipulated (see (B1) through (B4)).

Although only a screen transition corresponding to a lower-rightward manipulation of the lever 24 has been exemplified in FIG. 12, the above-described processing may be applied to all the manipulation directions and only to a predetermined manipulation direction.

Fourth Embodiment

Figure 13:
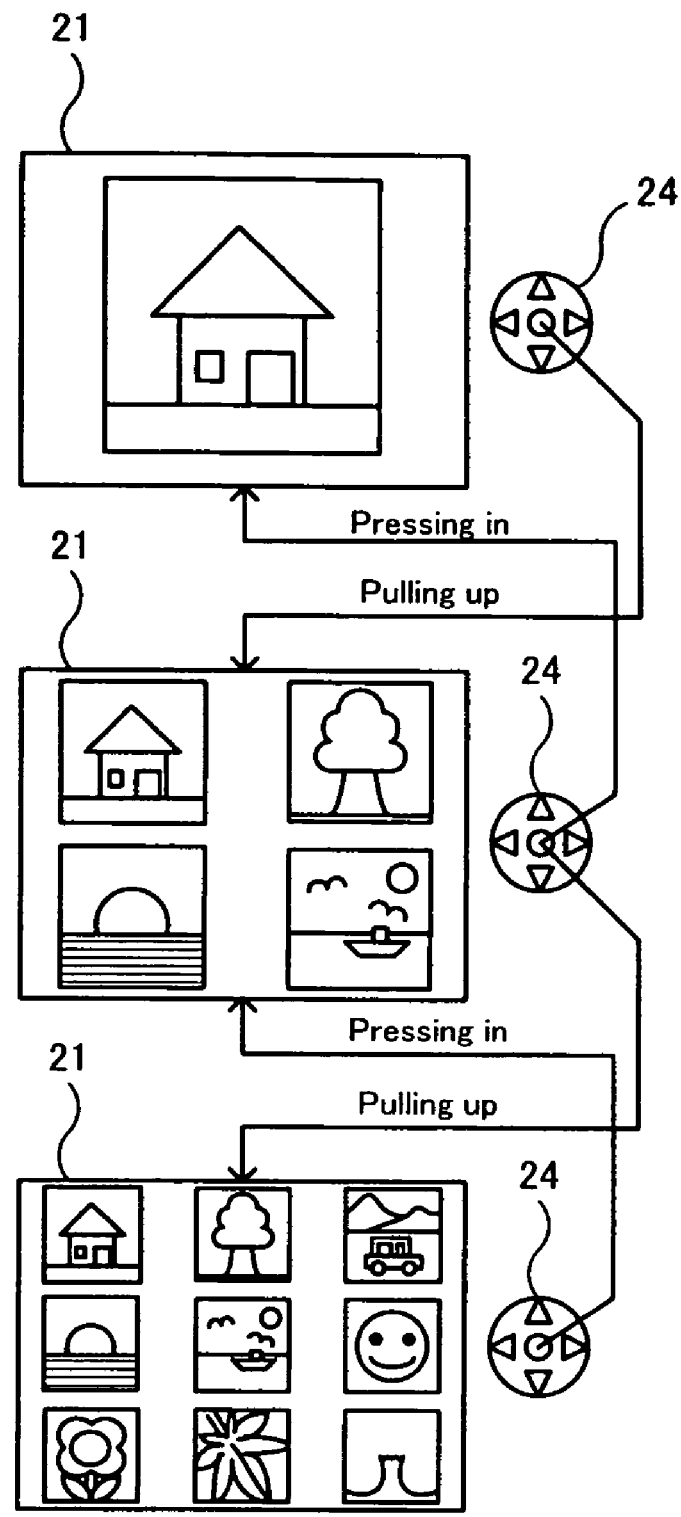
FIG. 13 is an explanatory screen transition diagram of an image reproducer according to a fourth embodiment.
Figure 14:
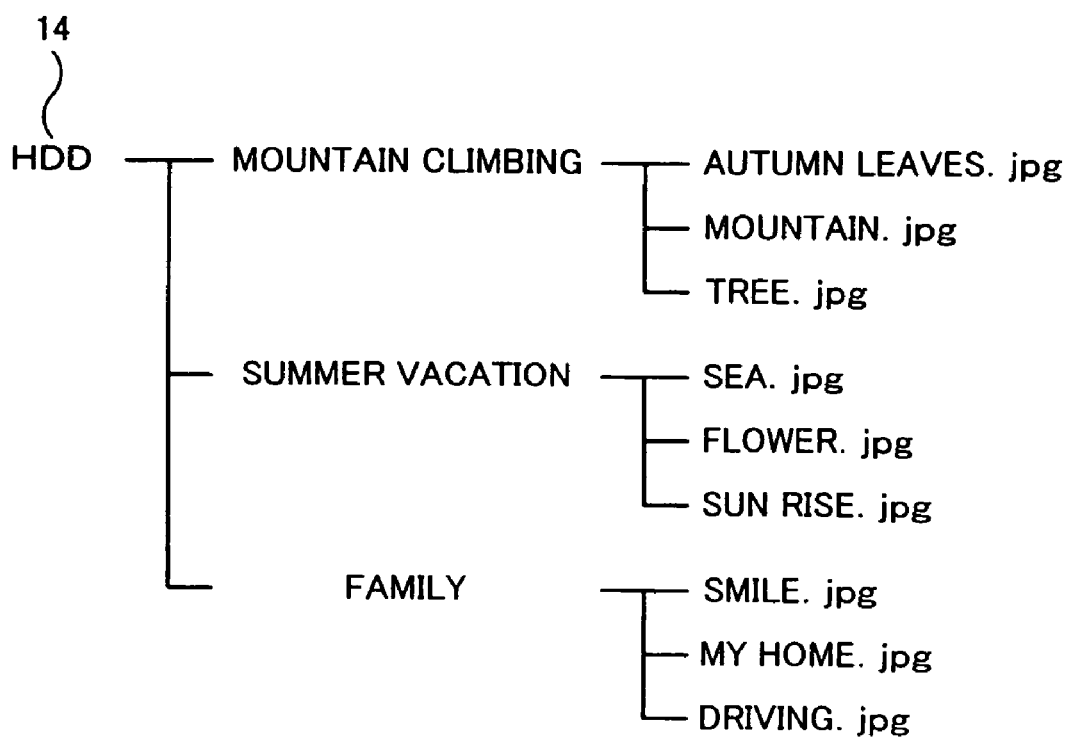
FIG. 14 is a schematic diagram showing a file configuration of an HDD related to a fifth embodiment.

FIG. 13 is an explanatory screen transition diagram of a reproduction mode of an image reproducer 4 according to the fourth embodiment.

Image display data similar to that in a predetermined area of an RAM 13 related to the third embodiment is stored in a predetermined area of the RAM 13 of the image reproducer 4 according to a fourth embodiment. However, the image reproducer 4 according to the fourth embodiment is capable of displaying a plurality of images at an LCD 21, so that in the RAM 13, preferably image display data containing at least an image that can be displayed in that condition may be stored. Specifically, in a case where the image reproducer 4 is such that the number of images displayed at the LCD 21 may change in accordance with a manipulation of a lever 24, that is, in a case where the number of images displayed at the LCD 21 changes to one, four, and nine in this order when the lever 24 is pulled up and also changes to nine, four, and one in this order when the lever 24 is pressed in as exemplified in FIG. 13. Preferably image display data containing at least these nine images may be stored in the RAM 13.

A single UI module 30 related to the fourth embodiment receives an manipulation of pressing in the lever 24 and that of pulling it up as commands to scale down and up a display-subject area respectively, in addition to the commands related to the first embodiment. The UI module 30 scales up or down a display-subject area in accordance with a command it has received and causes a graphic controller of a display portion 15 to further scale down or up an image of the scaled-up or scaled-down display-subject area so that the image can be displayed at the LCD 21. Then, the UI module 30 causes the graphic controller to display the thus scaled-up or scaled-down image at the LCD 21. Accordingly, a user can confirm images stored in an HDD 14 by displaying a plurality of images at the LCD 21 and, therefore, can easily select an image to be displayed.

It is to be noted that the UI module 30 has been described to scale up or down a display-subject area for image display data stored in the RAM 13 beforehand in accordance with a received command to thereby display a plurality of images at the LCD 21. However, the UI module 30 may generate image display data in accordance with a command each time it is received, thereby displaying a plurality of images at the LCD 21.

Further, the UI module 30 may receive as a command to scale down or up a display-subject area a manipulation different from that to press in or pull up the lever 24.

Fifth Embodiment

In an HDD 14 of an image reproducer 5 according to a fifth embodiment, a plurality of folders (e.g., MOUNTAIN CLIMBING folder, SUMMER VACATIN folder, and FAMILY folder) is formed on the same hierarchy, in each of which folders, images are stored. This plurality of folders is ordered by a table 72 shown in FIG. 15.

Figure 16:
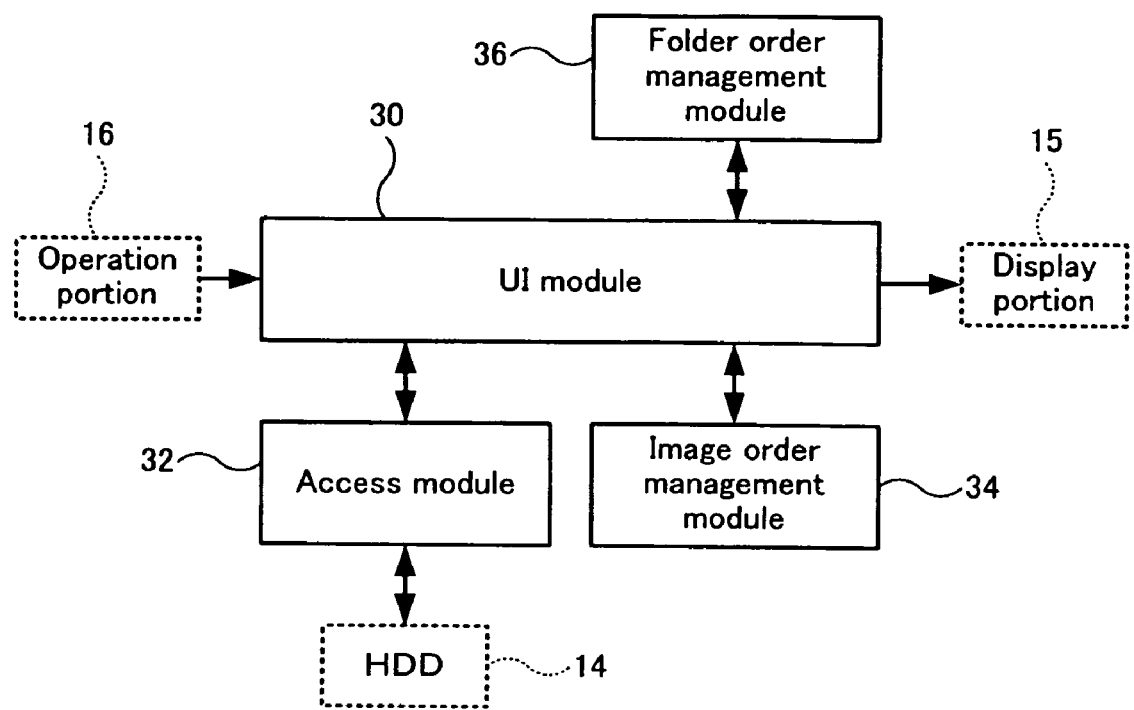
FIG. 16 is a block diagram showing a logical configuration of a reproduction program according to the fifth embodiment.

FIG. 16 is a block diagram showing a logical configuration of a reproduction program of an image reproducer 5 according to the fifth embodiment.

A single UI module 30 receives an manipulation of pressing in a lever 24 and that of pulling it up as commands to move among a plurality of folders formed on the same hierarchy, in addition to the commands related to the first embodiment. Specifically, the UI module 30 receives a manipulation of pressing in the lever 24 as a command to handle a folder immediately following a folder in which an image currently displayed at an LCD 21 is stored as a folder to be displayed and to display an image in this folder at the LCD 21. The UI module 30 receives another manipulation of pulling up the lever 24 as a command to handle a folder immediately preceding a folder in which an image currently displayed at the LCD 21 is stored as a folder to be displayed and display an image in this folder at the LCD 21. This command corresponds to "folder selection command" described in the claim. Further, the lever 24 related to the fifth embodiment functions also as fourth input means related to the fifth embodiment.

Figure 17:
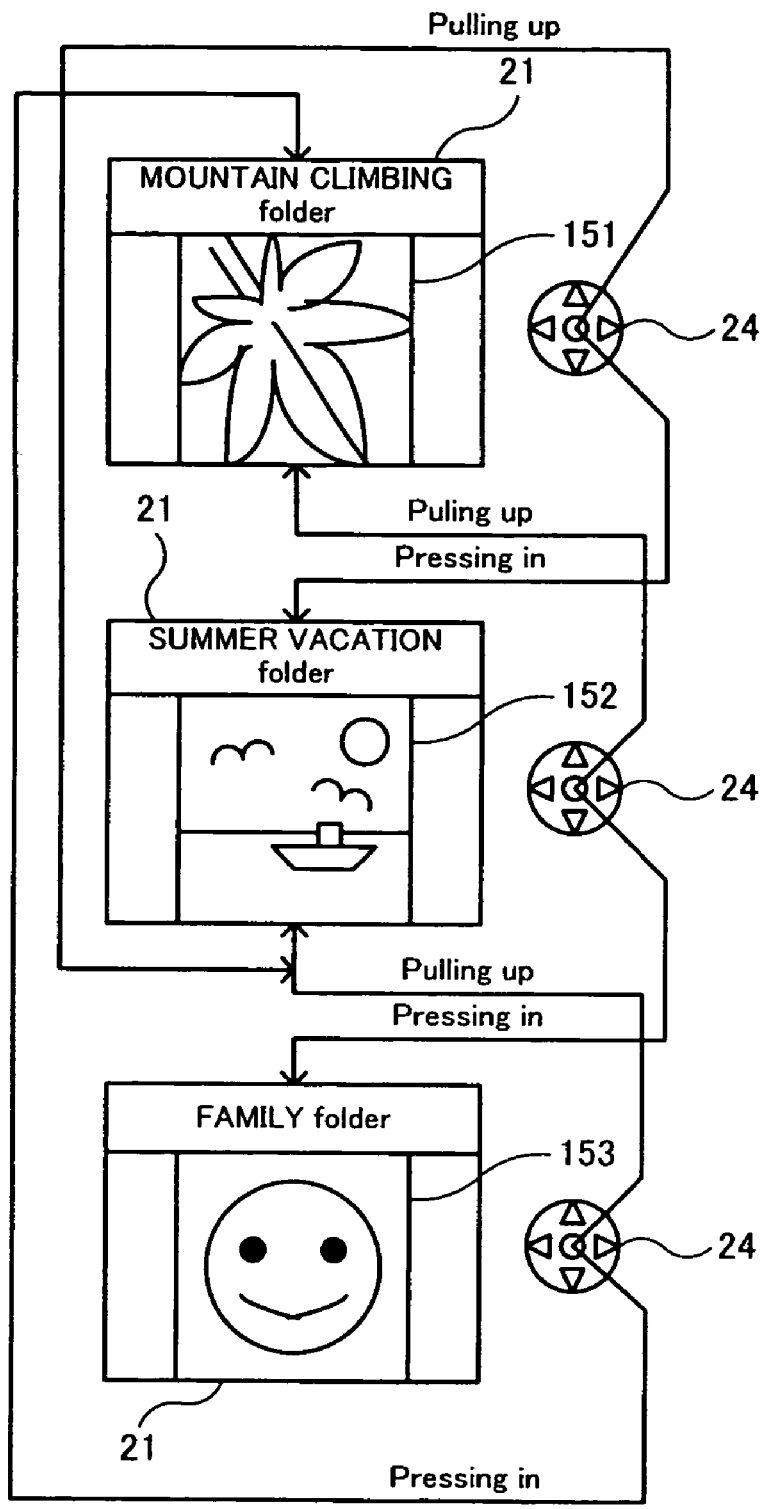
FIG. 17 is an explanatory screen transition diagram of an image reproducer according to the fifth embodiment.

A folder order management module 36 is a program component that causes a control portion 10 to function as folder order management means and folder selecting means. The folder order management module 36, like an image order management module 34, selects a folder to be displayed, by relating folders cyclically. In a case where the UI module 30 has received a manipulation of pressing in the lever 24 in a condition where, for example, an image 151 of AUTUMN LEAVES.jpg is displayed at the LCD 21, the folder order management module 36 as shown in FIG. 17 selects as a display-subject folder the SUMMER VACATION folder immediately following the MOUNTAIN CLIMBING folder in which the image of the AUTUMN LEAVES.jpg is stored. On the other hand, in a case where the UI module 30 has received a manipulation of pulling up the lever 24 in a condition where, for example, an image 152 of SEA.jpg is displayed at the LCD 21, the folder order management module 36 as shown in FIG. 17 selects as a display-subject folder the MOUNTAIN CLIMBING folder immediately preceding the SUMMER VACATION folder in which the image of the SEA.jpg is stored. That is, a user can move among a plurality of folders on the same hierarchy by using a simple operation.

It is to be noted that even if the UI module 30 has received a manipulation of pressing in the lever 24 in a condition where an image 153 of SMILE.jpg stored in the FAMILY folder that has an order number of three is displayed at the LCD 21, the folder order management module 36 can select the MOUNTAIN CLIMBING folder having an order number of one as a display-subject folder because it performs the above-described processing by relating the folders cyclically. That is, a user can move among a plurality of folders on the same hierarchy by performing a small number of manipulations.

It is to be noted that the UI module 30 may receive a manipulation different from those of pressing in and pulling up the lever 24, for example, a manipulation of inclining the lever 24 rightward or leftward for a predetermined lapse of time (shorter or longer period than that by an ordinary manipulation) as a command to move to a top folder or an end folder.

What is claimed is:

1. An apparatus for displaying an image comprising:
   an access unit that accesses images stored in a recording medium;
   an image order management unit that orders a plurality of the images cyclically such that an end one of the images may be followed by a top one of the images;
   a first input unit that inputs a first command;
   a second input unit that inputs a second command; and
   a display unit that displays on one screen a display-subject area that corresponds to one portion of such a two-dimensional array of the images such that images adjacent to each other in an x-direction have consecutive order numbers and a difference in order number between images adjacent to each other in a y-direction is a first value of not less than two, and moves the display-subject area in the x-direction in accordance with the first command and in the y-direction in accordance with the second command;
   a folder order management unit that cyclically orders a plurality of folders each of which stores the images such that an end folder of the folders may be followed by a top folder of the folders;
   a fourth input unit that inputs a folder select command; and
   a folder selection unit that sequentially selects the folders in accordance with the folder select command,
   wherein the display-subject area corresponds to one portion of the two-dimensional array of the images stored in the selected folder; and
   wherein the display unit continuously moves the display-subject area from a first image of the images adjacent to each other in an x-direction to a second image of the images adjacent to each other in an x-direction, or from a first image of the images adjacent to each other in a y-direction to a second image of the images adjacent to each other in a y-direction, and
   wherein the display unit moves the display-subject area to a position that includes an entirety of one of the images, each time the first, second, or third command is input.

2. The apparatus of claim 1, wherein the display unit moves the display subject area from a first position of at least a portion of a first image to a second position of at least a portion of a second image adjacent to the first image.

3. An apparatus for displaying an image comprising:
   an access unit that accesses images stored in a recording medium;
   an image order management unit that orders a plurality of the images;
   a first input unit that inputs a first command;
   a second input unit that inputs a second command;
   a third input unit that inputs a third command; and
   a display unit that displays on one screen a display-subject area that corresponds to one portion of such a three-dimensional array of the images such that images adjacent to each other in an x-direction have consecutive order numbers, a difference in order number between images adjacent to each other in a y-direction is a first value of not less than two, and a difference in order number between images adjacent to each other in a z-direction is a second value of not less than two different from the first value, and moves the display-subject area in the x-direction in accordance with the first command, in the y-direction in accordance with the second command, and in the z-direction in accordance with the third command;
   wherein the display unit continuously moves the display-subject area from a first image of the images adjacent to each other in an x-direction to a second image of the images adjacent to each other in an x-direction, or from a first image of the images adjacent to each other in a y-direction to a second image of the images adjacent to each other in a y-direction, and
   wherein the display unit moves the display-subject area to a position that includes an entirety of one of the images, each time the first, second, or third command is input.

4. The apparatus of claim 3, wherein the image order management unit orders a plurality of the images cyclically such that an end one of the images may be followed by a top one of the images.

5. The apparatus of claim 3, wherein the display unit moves the display subject area from a first position of at least a portion of a first image to a second position of at least a portion of a second image adjacent to the first image.

* * * * *